(12) United States Patent
Deffenbaugh et al.

(10) Patent No.: US 7,110,910 B1
(45) Date of Patent: Sep. 19, 2006

(54) METHOD AND APPARATUS FOR DETERMINING THE STRAIGHTNESS OF TUBES AND BARS

(75) Inventors: Mark Deffenbaugh, Massillon, OH (US); Michael Seifert, Massillon, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 11/151,036

(22) Filed: Jun. 13, 2005

(51) Int. Cl.
*G01B 7/00* (2006.01)
*G01B 15/00* (2006.01)

(52) U.S. Cl. .................................................. 702/155
(58) Field of Classification Search ............. 702/94, 702/95, 150–155
See application file for complete search history.

(56) References Cited

U.S. PATENT DOCUMENTS 5,157,734 A * 10/1992 Chen et al. ................ 382/153
5,408,318 A * 4/1995 Slater ......................... 356/487

* cited by examiner

*Primary Examiner*—Michael Nghiem
(74) *Attorney, Agent, or Firm*—Polster, Lieder, Woodruff & Lucchesi, L.C.

(57) ABSTRACT

A method and apparatus for automating the measurement of straightness of linear stock material produced by the operation of a mill. As the linear stock material exits from the mill, sensors acquire a sequence of image or distance measurement pairs associated with the material at discrete longitudinal points over a segment of the material. A processing system utilizes the data pairs to determine a set of centroids for a segment of the material. A virtual axis is identified between centroids associated with the segment, and the processing system determines a measure of deviation of each remaining centroid in a segment from the virtual axis to identify a degree of concavity of the material within the segment, as well as to identify a measure of the angular orientation of the concavity about the virtual axis.

27 Claims, 3 Drawing Sheets

METHOD AND APPARATUS FOR DETERMINING THE STRAIGHTNESS OF TUBES AND BARS

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

This invention relates in general to the production of linear stock material such as tube stock material and round bar stock material, and more particularly to an machine vision method and apparatus for the automated determination of the straightness of linear stock material during production.

Ideally, tube stock and round bar stock materials, generally referred to herein as linear stock material, should emerge from the mills in which they are produced in a perfectly straight configuration for the entire production length. But typically some deviation from perfectly straight exists in the linear stock material, which is acceptable for most purposes so long as the deviation is within prescribed tolerances. Currently mill operators conduct visual inspections to determine if sections of the linear stock material being produced by a mill falls within the prescribed tolerances. But this leaves much of the produced material without a quantitative inspection, and fails to detect deviation trends that could be corrected by making adjustment in the operation of the mill.

The typical inspection of a length of linear stock material, which may be between 4.5 meters to 12.0 meters in length, involves removing it from the mill in which it is produced and placing it on a flat table or level rails. There, an inspector using the flat surface of the table, determines the direction of any bow present in the linear stock material, and on which side of the bow is most pronounced—that is to say, the inspector determines the angular orientation, about the circumference of the linear stock material, the bow creates the greatest concavity.

Having located the side with the greatest concavity, the inspector places a precision straight edge, which can be typically one meter in length, against that side of the linear stock material. Any deviation from straight appears as a gap between the surface of the linear stock material and the straight edge, and is usually measured with a feeler gauge between the ends of the precision straight edge. The procedure is repeated for several segments along the length of the tube stock. Tube stock material and round bar stock material undergo similar inspection procedures for determining the presence of any deviation from an ideal straightness.

If quantitative inspection results are required, the typical inspecting procedure consumes a considerable amount of time, and without incurring inordinate expense, cannot be performed on all points of the material from a full production run at a mill. Thus, quantitative inspections are performed only on linear stock material selected using a screening method from a production run of a mill.

BRIEF SUMMARY OF THE INVENTION

Briefly stated, an embodiment of the present invention provides a method for automating the measurement of straightness of linear stock material produced by the operation of a mill. As the linear stock material exits from the mill, a sequence of image pairs of the material is acquired at discrete longitudinal points over a segment of the material. Each image pair includes images acquired along fields of view aligned perpendicularly to the material and which are preferably orthogonal to each other. Using the image pairs, a centroid for the material is determined for each segment end point and at least one intermediate segment point. A virtual axis is identified between each segment end point centroid. A measure of deviation of each intermediate centroid in a segment from the virtual axis identifies a degree of concavity of the material within the segment, as well as a measure of the angular orientation of the concavity about the virtual axis.

An alternate embodiment of the present invention provides a method for automating the measurement of straightness of linear stock material produced by the operation of a mill. As the linear stock material exits from the mill, measurement pairs of distances to the material are acquired at discrete longitudinal points over a segment of the material. Each measurement pair includes two measures of distance to the surface of the material acquired along fields of view aligned perpendicularly to the exterior surface of the material and which are angled relative to each other. Using the measured distances, the known diameter of the material, and the known configuration of the measurement system, a centroid for the material is determined for each segment end point and at least one intermediate segment point. A virtual axis is identified between each segment end point centroid. A measure of deviation of each intermediate centroid in a segment from the virtual axis identifies a degree of concavity of the material within the segment, as well as a measure of the angular orientation of the concavity about the virtual axis.

An alternate embodiment of the present invention provides an apparatus for automating the measurement of straightness of linear stock material produced by the operation of a mill. A pair of imaging sensors are disposed to acquire images of the linear stock material as it exits from a mill. The imaging sensors are disposed to have fields of view which are perpendicular to the material, and which are preferably orthogonal to each other within a common cross-sectional plane of the linear stock material. A processing system is configured to evaluate an image pair comprising images of the material acquired by each imaging sensor for a discrete point on the material, and to determine a centroid of the material at that discrete point. The processing system is further configured to establish a virtual longitudinal axis for a segment of material from the locations of determined centroids at each end of the segment, and to identify a degree of concavity of the linear stock material within the segment, as well as a measure of the angular orientation of the concavity about the virtual longitudinal axis, from at least one determined centroid disposed within the segment of material.

An alternate embodiment of the present invention provides an apparatus for automating the measurement of straightness of linear stock material produced by the operation of a mill. A pair of distance measurement sensors are disposed to acquire images of the linear stock material as it exits from a mill via a longitudinal conveyance device. The distance measurement sensors are disposed to acquire distance measurements along axis which are perpendicular to the material, and which are aligned at an angle relative to each other within a common cross-sectional plane of the linear stock material. A processing system is configured to evaluate an distance measurements to the exterior surface of the material acquired by each distance measurement sensor for a discrete cross-sectional plane of the material, and to determine a centroid of the material at that discrete point. The processing system is further configured to establish a virtual longitudinal axis for a segment of material from the locations of determined centroids at each end of the segment, and to identify a degree of concavity of the linear stock material within the segment, as well as a measure of the angular orientation of the concavity about the virtual longitudinal axis, from at least one determined centroid disposed within the segment of material.

The foregoing and other objects, features, and advantages of the invention as well as presently preferred embodiments thereof will become more apparent from the reading of the following description in connection with the accompanying drawings.

DESCRIPTION OF THE PREFERRED EMBODIMENT

Figure 1:
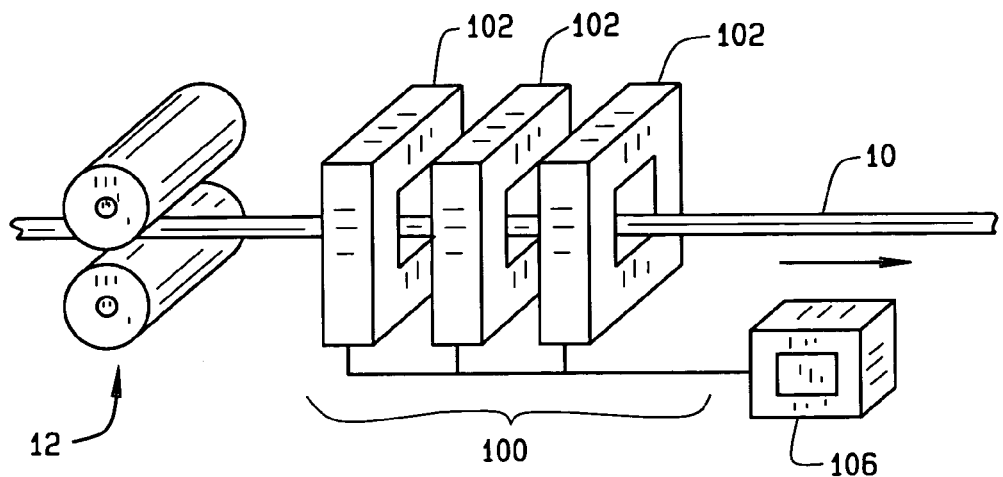
FIG. 1 is a perspective view of an embodiment of the measurement system of the present invention disposed to measure linear stock material from a mill as it is conveyed through the measurement system.

Turning to FIG. 1, a length of linear stock material 10 exiting a mill production line 12 is passed through a non-contact straightness measurement system of the present invention, shown generally at 100. In one embodiment, the measurement system 100 comprises at least three imaging modules, shown generally at 102, which are disposed in a linearly spaced configuration along a common longitudinal axis corresponding to the direction of travel for the linear stock material 10. Preferably, each imaging module 102 is spaced apart by approximately ½ the straightness reference length.

Figure 2:
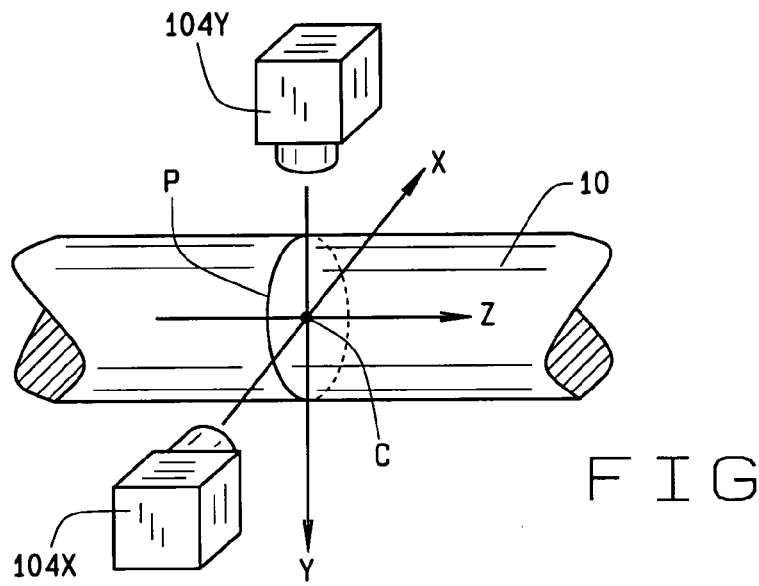
FIG. 2 is a perspective view illustrating imaging components of an embodiment present invention and associated fields of view in relationship to a segment of linear stock material.

Each imaging module 102 includes a pair of orthogonally disposed imaging sensors 104X and 104Y, each having a field of view aligned with a cross-sectional plane P of the linear stock material 10 passing through the imaging module 102, as best seen in FIG. 2. The specific angular orientation of the pair of imaging sensors 104X and 104Y about the longitudinal axis of the linear stock material 10 is not limited to that shown in FIG. 2, and those of ordinary skill in the art will recognize that the pair of imaging sensors may have a different angular orientation, and that the relationship between each imaging sensor 104X and 104Y does not have to be orthogonal.

Figure 3A:
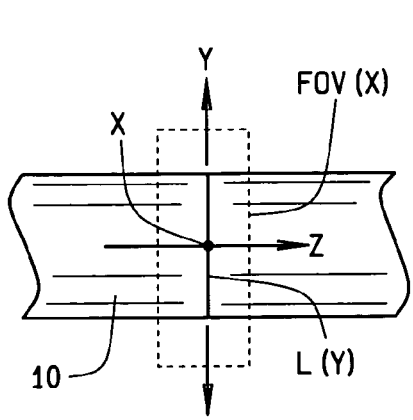
FIG. 3A is a exemplary illustration of an image and field-of-view of the linear stock material acquired by a Y-axis imaging component of FIG. 2.
Figure 3B:
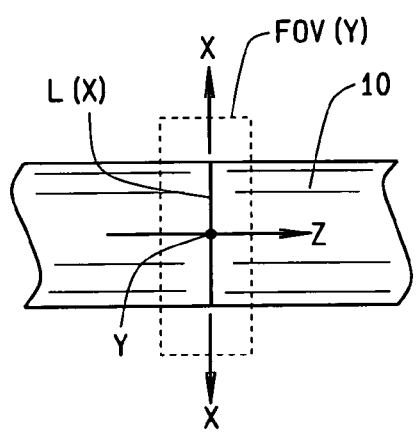
FIG. 3B is a exemplary illustration of an image and field-of-view of the linear stock material acquired by an X-axis imaging component of FIG. 2.

Each imaging sensor 104X and 104Y includes conventional optics, imaging components, and image processing components. For example, a pin-hole lens or optical lens, a CMOS or CCD image array, and associated electronic circuits. Each imaging sensor 104X and 104Y is capable of acquiring an image of a portion of an exterior surface of the linear stock material 10, including visible edges, within an associated field of view. For example, as shown in FIGS. 2 and 3A, imaging sensor 104X is disposed within the imaging module 102 to acquire an image of an exterior surface of the linear stock material 10 visible along the X-axis within a field of view FOV(X), while the imaging sensor 104Y is disposed within the imaging module 102 to acquire an image of an exterior surface of the linear stock material 10 visible along the Y-axis within a field of view FOV(Y).

Figure 4:
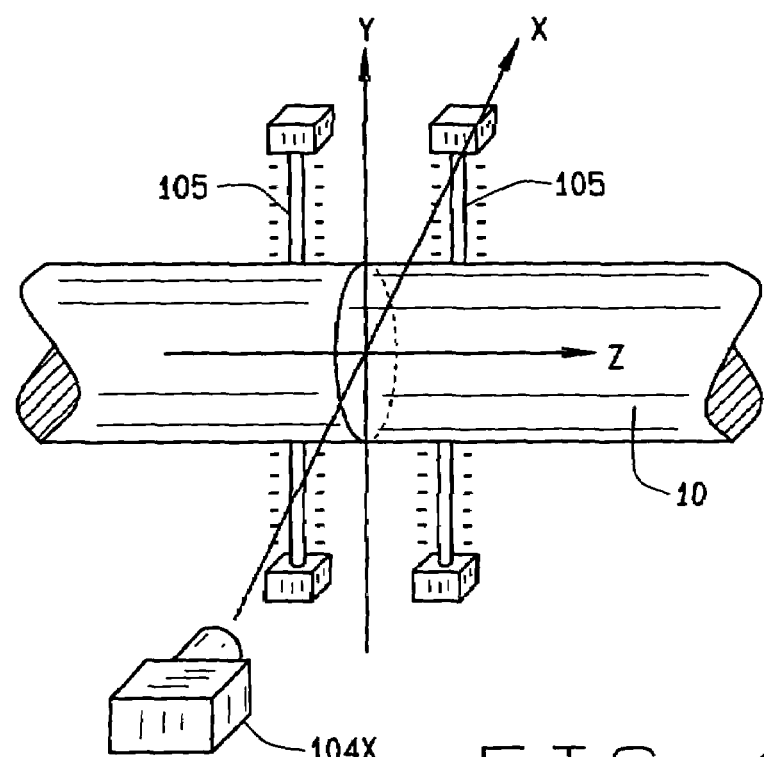
FIG. 4 is a perspective view illustrating exemplary placement of backlights relative to an imaging component and a segment of linear stock material.

To facilitate the acquisition of the images of the linear stock material 10 by each imaging module 102, a variety of illumination techniques may be utilized. Preferably, backlighting illumination is utilized, such that the exterior surface of the linear stock material 10 appears dark relative to a highly illuminated background, providing a sharp contrast between the observed light background and dark exterior surface of the linear stock material 10 in each image. For example, as shown in FIG. 4, a pair of fluorescent bulbs 105, having a length which is greater than the width of the linear stock material 10 may be disposed on the opposite side of the linear stock material 10 from an individual imaging sensor 104X or 104Y. Preferably, the fluorescent bulbs 105 are offset from the optical axis of the imaging sensors, providing illumination for multiple imaging sensors, and to reduce the occurrence of shadow effects in the illumination of the linear stock material peripheral edges. Those of ordinary skill in the art will recognize that other illumination techniques, including front-lighting techniques, may be utilized which facilitate the identification of the peripheral edges of the linear stock material 10 in images acquired by each imaging module 102, and that for some applications, supplemental illumination may not be required.

Images acquired simultaneously by each imaging sensor 104X and 104Y in each imaging module 102 are communicated to a processing system 106, wherein the edges of the linear stock material 10 in each image are identified. The processing system 106 preferably include at least one central processing unit having sufficient computation capacity, and configured with a software application, to carry out the functions of the present invention. Utilizing the identified edges in each image, together with known parameters of the measurement system, the processing system 106 calculates one or more dimensions L(x) and L(y) of the stock material on the X and Y axis, respectively. The calculated dimensions are further utilized by the processing system 106 to determine at least a three-dimensional coordinate of a centroid C associated with each cross-sectional plane P of the linear stock material 10 imaged by an associated imaging module 102. Additional characteristics or features of the linear stock material 10, such as an outer diameter or a degree of roundness, may be calculated by the central processing system 106.

Figure 5:
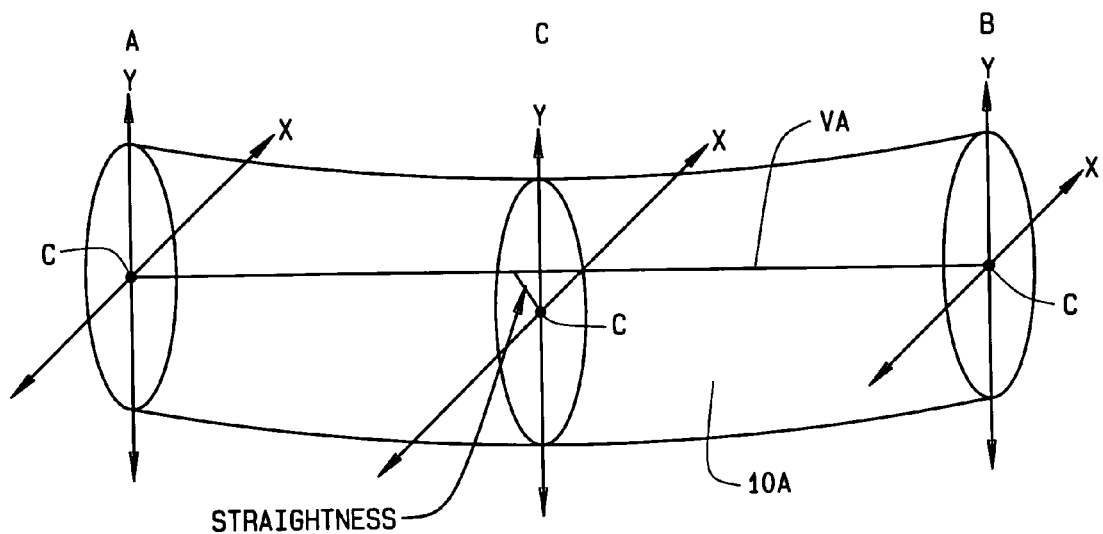
FIG. 5 is an illustration of a minimal set of calculated centroids for a segment of linear stock material.
Figure 6:
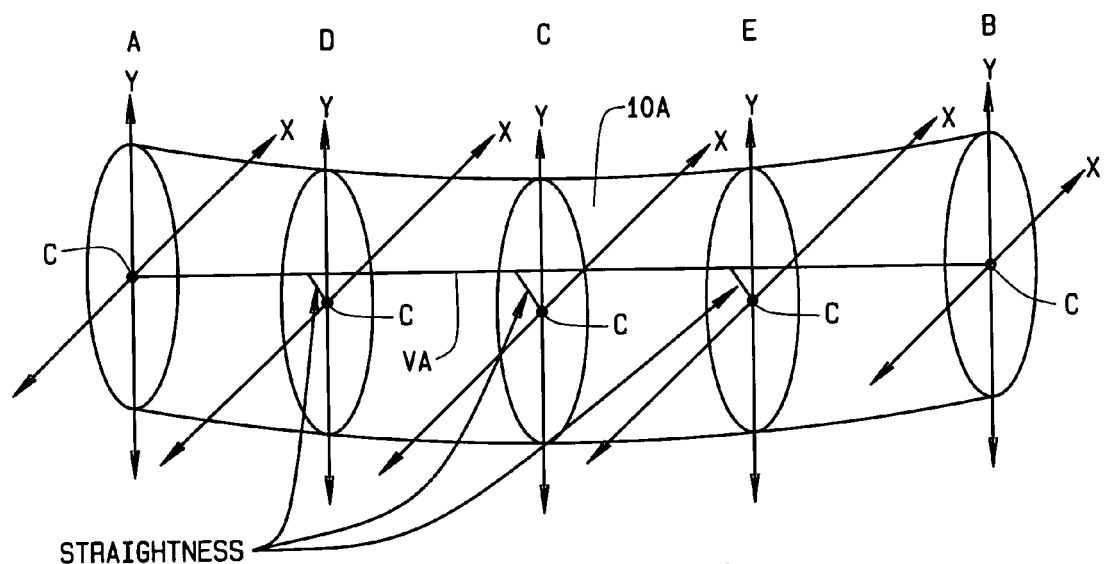
FIG. 6 is an illustration of a set of calculated centroids for the segment of FIG. 5.

Once a set of centroids C, including two end centroids and at least one intermediate centroid, have been calculated by the central processing system 106 for a segment 10A of the linear stock material 10, the central processing system 106 establishes at least virtual longitudinal axis VA for the segment 10A between two of the calculated centroids C. Preferably, as shown in FIGS. 5 and 6, the virtual longitudinal axis VA is established between the outermost or end centroids C in the segment 10A, however, those of ordinary skill in the art will recognize that a virtual longitudinal axis VA may be established using any two calculated centroids C. Similarly, the virtual longitudinal axis VA may be established by the central processing system 106 utilizing a linear best-fit algorithm and more than two of the calculated centroids C.

Once the virtual longitudinal axis VA is established for a segment 10A of the linear stock material 10, the central processing system 106 calculates a displacement of each remaining centroid C in the segment 10A from the virtual longitudinal axis VA. The calculated displacement represents a measure of the straightness or curvature (concavity) of the linear stock material 10 at that point within the segment 10A. Those of ordinary skill in the art will recognize that sensitivity of the measurement system 100 to curvature in a segment 10A of linear stock material 10 can be increased by determining an increased number of centroids C over the length of the segment 10A, as shown in FIG. 6.

Once the measure of curvature or straightness of a segment 10A of the linear stock material 10 is determined by the central processing system 106, the measure of curvature or straightness profile may be utilized in a variety of ways. For example, the straightness or curvature of a single segment 10A of the linear stock material may be compared with a predetermined tolerance to identify linear stock material 10 which has at least one identified segment 10A exceeding the predetermined tolerance. Similarly, by acquiring measures of straightness or curvature for multiple segments 10A along the length of a piece of linear stock material 10, an overall measure of curvature or straightness of the linear stock material 10 can be identified and compared with predetermined tolerances. Those of ordinary skill in the art will recognize that the segments 10A over which the curvature or straightness is measured need not be discrete, and in fact, can overlap to provide a more accurate measure of the characteristics of the linear stock material 10. By storing the measures of curvature or straightness for linear stock material 10 exiting a mill 12 over time, trends or changes in the characteristics of the linear stock material 10 output can be noted and flagged for operator inspection or correction.

Figure 7:
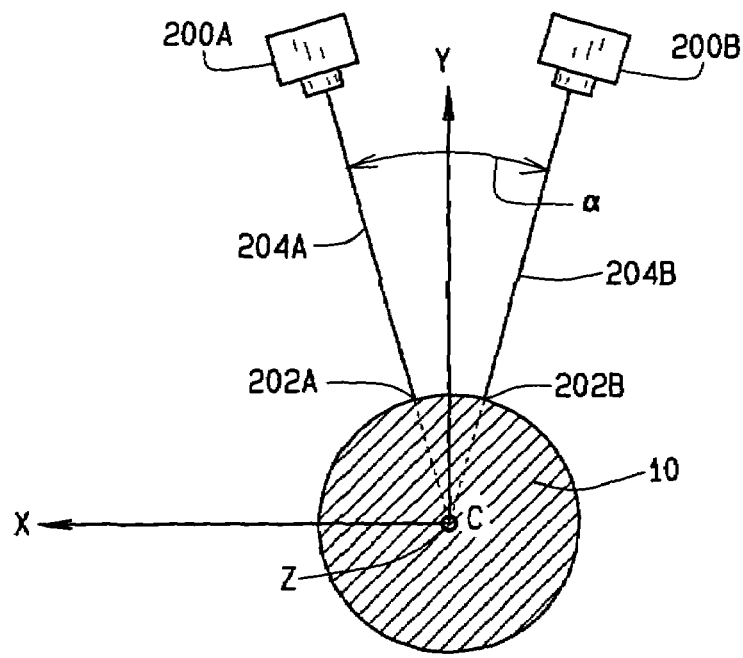
FIG. 7 is a cross-sectional view of a segment of linear stock material illustrating an alternate embodiment distance measurement system of the present invention.

Turning to FIG. 7, an alternate embodiment of the present invention is shown in which the imaging sensors 104X and 104Y in each imaging module 102 are replaced with a pair of distance measurement sensors 200A and 200B mounted in a predetermined and known configuration. Each distance measurements sensor 200A and 200B is disposed within a common cross-sectional plane of the linear stock material 10, and aligned along an axis which is perpendicular to the exterior surface of the linear stock material 10. However, unlike the imaging sensors 104X and 104Y, the distance measurements sensors 200A and 200B are not typically disposed in an orthogonal relationship to each other, but rather, are separated by an acute angular orientation α, preferably having an arc of about 28 degrees about a common centerpoint. The acute angular orientation between each distance measurement sensor 200A and 200B enables the measurement system 100 to accommodate linear stock material 10 having different outer diameters without requiring reconfiguration.

Each distance measurement sensor 200A and 200B is configured to acquire a distance measurement between the distance measurement sensor 200A and 200B, and a respective point 202A, 202B on the surface of the linear stock material 10 co-linear with each detector axis 204A, 204B. In one configuration, each distance measurement sensor 200A, 200B is configured with a laser projection system to project a point of laser light onto the points 202A, 202B on the surface of the linear stock material 10. An optical sensor disposed within each distance measurement sensor 200A, 200B obtains an image of the projected point, and calculates a distance thereto.

For linear stock material having an outer diameter known to within a predetermined tolerance, the central processing system 106 is configured with a software algorithm to utilize the distance measurements obtained by each distance measurement sensor 202A, and 202B together with the predetermined and known configuration of the distance measurements sensors 202A and 202B, to identify the coordinates of a centroid C of the linear stock material in the cross-sectional plane using conventional geometric relationships. Curvature of the linear stock material 10 results in variations in the measured distances to the points 202A and 202B along the length of a segment 10A, as each point 202A and 202B shifts about the exterior surface of the segment 10A, and accordingly changes the centroid coordinates within the respective cross-sectional planes. Once a set of centroids C are identified for a segment 10A of the linear stock material 10, the straightness of curvature of the segment 10A is determined as previously described in relation to a determined virtual axis VA for each segment 10A.

Those of ordinary skill in the art will recognize that a set of centroids C for a segment 10A of linear stock material 10 may be determined using a variety of techniques and components without departing from the scope of the present invention.

The invention claimed is:

1. A method for automating the measurement of straightness of linear stock material, comprising:
   determining an end centroid for a perpendicular cross-section of the linear stock material at each end of a segment of the linear stock material;
   determining at least one intermediate centroid for a perpendicular cross-section of the linear stock material disposed within said segment;
   establishing a virtual longitudinal axis of the linear stock material between each of said determined end centroids;
   for each intermediate centroid, determining a measure of displacement from said virtual longitudinal axis;
   for each intermediate centroid, determining a measure of angular orientation about said virtual longitudinal axis;
   utilizing each said determined measure of displacement and each said determined measure of angular orientation to identify a direction and magnitude of concavity in the linear stock material; and
   storing a representation of said identified direction and magnitude of concavity for said segment of linear stock material.

2. The method of claim 1 wherein said steps of determining end centroids, determining at least one intermediate centroid, determining a virtual longitudinal axis, determining measures of displacement, and determining measures of angular orientation are repeated for at least one additional segment of the linear stock material to identify said direction and magnitude of concavity in the linear stock material.

3. The method of claim 1 wherein said steps of determining each end centroid and determining each intermediate centroid each include acquiring first and second orthogonal images of the linear stock material in a cross-sectional plane; and calculating a centroid of the linear stock material within said cross-sectional plane from said first and second orthogonal images.

4. The method of claim 3 wherein said step of acquiring first and second orthogonal images of the linear stock material in a cross-sectional plane further includes providing illumination of the linear stock material in said cross-sectional plane.

5. The method of claim 4 wherein said illumination is backlight illumination.

6. The method of claim 1 wherein said steps of determining each end centroid and determining each intermediate centroid each include acquiring a pair of distance measurements associated with an exterior surface of the linear stock material in a cross-sectional plane; and calculating a centroid of the linear stock material within said cross-sectional plane utilizing said pair of distance measurements.

7. The method of claim 1 further including the step of comparing said stored representation magnitude of concavity for said segment of linear stock material with a predetermined concavity tolerance value; and providing a signal responsive to said segment of linear stock material having a magnitude of concavity which exceeds said predetermined concavity tolerance value.

8. The method of claim 1 further including the step of providing a visual display of said identified direction and magnitude of concavity for said segment of linear stock material.

9. The method of claim 1 wherein said steps of determining, determining, establishing, determining, determining, utilizing, and storing are repeated for a plurality of segments of linear stock material; and processing stored representations of direction and magnitude of concavity for said plurality of segments of linear stock material to identify a change in concavity of said plurality of segments of linear stock material over time.

10. A method for automating the measurement of straightness of linear stock material, comprising:

determining a centroid for each of at least three discrete perpendicular cross-sections of the linear stock material, said determined centroids defining a segment of the linear stock material;

establishing a virtual longitudinal axis of the linear stock material between two of said determined centroids;

for each remaining centroid, determining a measure of displacement from said virtual longitudinal axis;

for each remaining centroid, determining a measure of angular orientation about said virtual longitudinal axis;

utilizing each said determined measure of displacement and each said determined measure of angular orientation to identify a direction and magnitude of concavity in the linear stock material over said segment; and storing a representation of said identified direction and magnitude of concavity for said segment of the linear stock material.

11. The method of claim 10 wherein said virtual longitudinal axis is established between said determined centroids having maximum longitudinal displacement from each other.

12. The method of claim 10 wherein said steps of determining said centroids, establishing a virtual longitudinal axis, determining measures of displacement, and determining measures of angular orientation, are repeated for at least one additional segment of the linear stock material to identify said direction and magnitude of concavity in the linear stock material.

13. The method of claim 10 wherein said step of determining said centroids includes, for each of said centroids, acquiring first and second orthogonal images of the linear stock material in a cross-sectional plane; and calculating each centroid of the linear stock material within said cross-sectional plane from said associated first and second orthogonal images.

14. The method of claim 13 wherein said step of acquiring each of said first and second orthogonal images of the linear stock material in said cross-sectional planes further includes illuminating the linear stock material in said cross-sectional planes, and acquiring first and second orthogonal images of said illuminated linear stock material.

15. The method of claim 10 wherein said step of determining said centroids includes, for each of said centroids, acquiring a pair of distance measurements associated with an external surface of the linear stock material in a cross-sectional plane; and calculating each centroid of the linear stock material within said cross-sectional plane utilizing said pair of distance measurements.

16. The method of claim 10 further including the step of comparing said stored representation magnitude of concavity for said segment of linear stock material with a predetermined concavity tolerance value; and providing a signal responsive to said segment of linear stock material having a magnitude of concavity which exceeds said predetermined concavity tolerance value.

17. The method of claim 10 further including the step of providing a visual display of said identified direction and magnitude of concavity for said segment of linear stock material.

18. The method of claim 10 wherein said steps of determining, determining, establishing, determining, determining, utilizing, and storing are repeated for a plurality of segments of linear stock material; and processing stored representations of direction and magnitude of concavity for said plurality of segments of linear stock material to identify a change in concavity of said plurality of segments of linear stock material over time.

19. The method of claim 10 wherein said steps of determining, determining, establishing, determining, determining, utilizing, and storing are repeated for a plurality of consecutive segments of linear stock material comprising a length of linear stock material; and processing stored representations of direction and magnitude of concavity for said plurality of consecutive segments of linear stock material to identify a direction and magnitude of concavity for said length of linear stock material.

20. A non-contact linear stock material straightness measurement system comprising:

a plurality of spaced sensor modules, each sensor module configured to acquire data from of an external surface of a linear stock material in an associated cross-sectional plane; and a processing system operatively coupled to each of said sensor modules to receive data there from, said processing system configured with a software algorithm to calculate a location of a centroid of said linear stock material in each of said associated cross-sectional planes;

wherein said processing system is further configured with a software algorithm to determine a direction and magnitude of concavity in said linear stock material over a segment defined by said centroids; and wherein said processing system stores the determined direction and magnitude of concavity for said segment of the linear stock material.

21. The non-contact linear stock material straightness measurement system of claim 20 wherein said processing system is further configured with a software algorithm to determine a virtual longitudinal axis of said linear stock from at least two of said calculated centroids; and wherein said processing system is further configured with a software algorithm to determine a displacement from said virtual longitudinal axis, together with an angular orientation about said virtual longitudinal axis, for at least one calculated centroid.

22. The non-contact linear stock material straightness measurement system of claim 20 wherein said processing system is further configured with a software algorithm to determine a virtual longitudinal axis of said linear stock from at least two of said calculated centroids using a best-fit algorithm.

23. The non-contact linear stock material straightness measurement system of claim 20 wherein said processing system is further configured with a software algorithm to determine said virtual longitudinal axis of said linear stock between said calculated centroids having the greatest linear separation, said calculated centroids having the greatest linear separation defining a segment of said linear stock material.

24. The non-contact linear stock material straightness measurement system of claim 20 wherein each sensor module is further configured with an illumination system adapted to illuminate said linear stock material in said associated cross-sectional plane.

25. The non-contact linear stock material straightness measurement system of claim 24 wherein each illumination system includes a light source configured to provide backlighting illumination to said linear stock material.

26. The non-contact linear stock material straightness measurement system of claim 20 wherein each linearly spaced sensor module is configured to simultaneously acquire first and second orthogonal images of said portions of said external surface of said linear stock material in said associated cross-sectional planes.

27. The non-contact linear stock material straightness measurement system of claim 20 wherein each linearly spaced sensor module is configured to simultaneously acquire a pair of distance measurements to associated points on said exterior surface of said linear stock material in said associated cross-sectional planes.

* * * * *